US006921909B2

(12) United States Patent
Nagarkar et al.

(10) Patent No.: US 6,921,909 B2
(45) Date of Patent: Jul. 26, 2005

(54) PIXELLATED MICRO-COLUMNAR FILMS SCINTILLATOR

(75) Inventors: Vivek V. Nagarkar, Newton, MA (US); Sameer V. Tipnis, Waltham, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 215 days.

(21) Appl. No.: 10/228,394

(22) Filed: Aug. 27, 2002

(65) Prior Publication Data

US 2004/0042585 A1 Mar. 4, 2004

(51) Int. Cl.[7] ................................................ G01N 21/36

(52) U.S. Cl. ................................ 250/483.1; 250/472.1; 250/370.09; 250/363.01; 250/363.02; 250/367; 250/370.11; 250/390.11

(58) Field of Search ........................... 250/483.1, 472.1, 250/370.09, 363.01, 363.02, 367, 370.11, 390.11

(56) References Cited

U.S. PATENT DOCUMENTS 4,415,808 A * 11/1983 Cusano et al. .............. 250/367
4,788,436 A * 11/1988 Koechner ................ 250/485.1
5,153,438 A * 10/1992 Kingsley et al. ....... 250/370.09
5,187,369 A * 2/1993 Kingsley et al. ....... 250/370.11
5,519,227 A 5/1996 Karellas .................. 250/483.1

OTHER PUBLICATIONS

Nargarkar et al."Structured CsI (TI) Scintillators for X–ray Imaging Applications" Jun. 1998, IEEE, vol. 45, pp. 492–496.*

Tipnis et al. "Large Area CCD Based Imaging System for Mammography" Oct. 1999, IEEE, vol. 2, pp. 1043–1046.*

* cited by examiner

*Primary Examiner*—David Porta
*Assistant Examiner*—Christine Sung
(74) *Attorney, Agent, or Firm*—Thomas M. Saunders; Brown Rudnick Berlack Israels LLP

(57) ABSTRACT

A method of fabricating an apparatus for an enhanced imaging sensor consisting of pixellated micro columnar scintillation film material for x-ray imaging comprising a scintillation substrate and a micro columnar scintillation film material in contact with the scintillation substrate. The micro columnar scintillation film material is formed from a doped scintillator material. According to the invention, the micro columnar scintillation film material is subdivided into arrays of optically independent pixels having interpixel gaps between the optically independent pixels. These optically independent pixels channel detectable light to a detector element thereby reducing optical crosstalk between the pixels providing for an X-ray converter capable of increasing efficiency without the associated loss of spatial resolution. The interpixel gaps are further filled with a dielectric and or reflective material to substantially reduce optical crosstalk and enhance light collection efficiency.

36 Claims, 4 Drawing Sheets

PIXELLATED MICRO-COLUMNAR FILMS SCINTILLATOR

FIELD OF THE INVENTION

This invention is drawn to a pixellated micro-columnar film scintillator for X-ray imaging with the pixellation resulting in enhanced image contrast. In one embodiment the material of the scintillator is micro-columnar film vapor deposited upon a substrate and pixellated.

BACKGROUND OF INVENTION

The World Health Organization's (WHO) International Agency for Research on Cancer (IARC), in Lyon, France, estimates that more than 150,000 women worldwide die of breast cancer each year. During 1999 breast cancer accounted for 29% of all new cancer related cases and 16% of cancer-related deaths in the women population in the United States alone. It has been recognized that treatment effectiveness strongly depends upon early detection and that the x-ray mammography is the only valid and established screening test procedure for detecting early-stage, clinically occult, breast cancer.

Presently virtually all routine clinical x-ray imaging of the breast is performed with screen-film. This approach provides moderately high spatial resolution and contrast. Some reports indicate significantly reduced breast cancer mortality by early detection has favorable risk/benefit ratio. Film-screen technique has significant inherent limitations. For example, the sensitivity of film-screen mammography for the dense breast is very low and the positive predictive value of findings sent to biopsy averages only about 30%. Other well-known shortcomings of film-screen are its limited dynamic range, limited contrast sensitivity, high noise to signal ratio and lack of convenient options for post-processing images. An added difficulty with film-screen mammography is the logistics of multiple expert opinions, as mailing of films to radiologists for consultation is time consuming and impractical.

Digital mammography has a potential to overcome limitations of screen-film systems. Important advantages of digital mammography include higher detection efficiency, significantly wide dynamic range, contrast enhancement, and post processing capabilities such as computer-aided diagnosis and web base instantaneous access to the images by multiple expert radiologists. Furthermore, digital data acquisition enables the exploration of novel imaging techniques such as tomosynthesis, dual energy mammography, and digital subtraction imaging. Until recently, digital mammography was limited to small field devices for stereotactic localization, core biopsy, and spot compression view. Fortunately, advancements in technology in the past decade have now made it feasible to obtain large area high-quality images using digital detectors. These include both charged coupled device ("CCD") and amorphous silicon photodiodes (a-Si:H) that utilize a scintillator as the primary detection layer to convert x-rays to light. This light is subsequently detected by the photosensing silicon elements. The US Food and Drug Administration (FDA) has recently approved the full-breast digital imaging system manufactured by General Electric that uses 100 m pixel a-Si:H flat panel with structured CsI:Tl as a scintillator layer. Also, Lorad's fiberoptic taper based CCD coupled to CsI:Tl sensor, and slot scan imaging system, developed by Fischer Imaging, which uses a linear CCD array with a CsI:Tl converter has recently received an FDA approval.

Unfortunately, in spite of its potential, recent results from clinical trials suggest that current digital mammography is only equivalent to film-screen. The next step in Digital mammography is its advancement to a stage where its efficiency and resolution is superior to film-screen. One component that presently limits the performance is the scintillator converter. Using conventional screens involves a fundamental tradeoff between increasing thickness (and hence efficiency) and decreasing spatial resolution (due to lateral light spreading). An x-ray converter capable of increasing efficiency without the associated loss of spatial resolution would substantially improve the quality of mammographic images while reducing the dose given to the radiosensitive breast tissue.

SUMMARY OF INVENTION

The present invention addresses the above-identified needs by providing an apparatus for an enhanced imaging sensor consisting of micro pixellated scintillator for x-ray imaging comprising a microcolumnar scintillator film in contact with a substrate wherein the micro columnar scintillator film is formed from a doped scintillator material. According to the invention, the micro columnar scintillator film is subdivided into arrays of optically independent pixels having interpixel gaps. These optically independent pixels channel detectable light to a detector element thereby reducing optical crosstalk between the pixels providing for an x-ray converter capable of increasing efficiency without the associated loss of spatial resolution.

The pixellation of the micro columnar scintillator film forms wedge shaped gaps that are filled with a reflective or refractive dielectric material that substantially reduces optical cross talk between the pixels. Additionally, after the pixellation of the micro columnar scintillator film the film is redoped with a doping compound allowing for improved detective quantum efficiency of the resulting mammography detector.

The scintillation light produced by the X-ray interaction is channeled within the micro columnar scintillation film via total internal reflection. The light that escapes channeling is confined within a pixel formed by laser ablation, resulting in significant reduction in the lateral light spread and hence the glare in the image. Thus, the micro-columnar structure of the film enhances resolution at high spatial frequencies, which is critical for defining shapes of microcalcifications, and laser pixellation enhances the overall image contrast. A significant advantage of the inventive method is that it allows laser pixellation of very thick scintillator films which offer increased x-ray absorption, thus overcoming the traditional tradeoff between detection efficiency and resolution.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION OF THE INVENTION

Figure 1A:
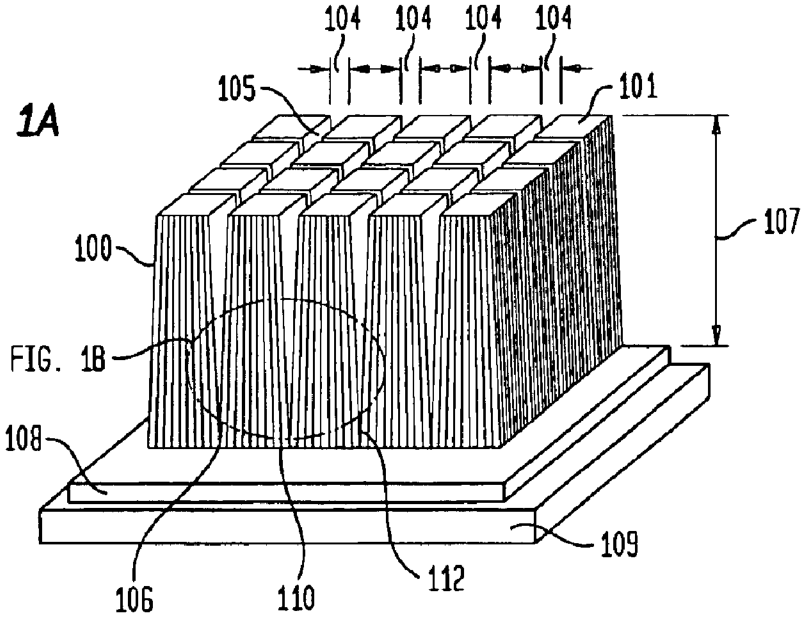
FIG. 1A is a diagrammatic representation of a micro-columnar film pixellated according to the invention.

The present invention relates to micro columnar scintillator film for use as an X-ray sensor in the energy range from 8 KeV to 140 KeV or more in digital radiography including but not limited to applications such as dentistry and mammography.

The invention will be better understood with reference to the following definitions:

A. "Microcolumnar Scintillation Film Material" shall mean a compound that emits detectable light upon absorption of X-ray or other high energy particles, B. "Detectable light" shall mean any light within a desired spectral range, such as light capable of detection by charge coupled device or other scintillation detectors;

C. "Pixel" shall mean segments of scintillation film material that make up a scintillation screen. In various embodiments pixels are of a variety of shapes that may or may not fully circumscribe a particular pixel. It shall be understood that, in so far as a function of interpixel gaps is to reduce the lateral path of errant photons, a pixel is sufficiently defined by a gap which is less than fully surrounding of given pixel;

D. "Pixellated" shall mean the process of dividing a scintillation film material into a plurality of pixels. Empirically it shall be understood that a pixellated device shall have interpixel gaps, which reduce the lateral path of errant photons;

E. "Interpixel Gap" shall mean the voids between the pixels with facing boundaries even if such void is filled with non-scintillating material. In a particular embodiment facing pixels define a wedge shape interpixel gap (e.g. linear, bi-concave or bi-convex or other shapes);

F. "Substantially Wedge Shape" shall mean any interpixel gap having a top gap that is larger then its bottom gap;

G. "Activator" also known as dopant shall mean an anion that, in combination with a scintillation film material, producing emission of detectable light within a desired spectral wavelength upon excitation by x-ray or high energy particle;

H. "Redoping" shall mean the application of an activator anion to the pixellated micro columnar scintillation film material that has been depleted of activator. In particular embodiments such as high temperature excimer laser at atmospheric pressure dopant may be depleted from the micro-columnar scintillation film material, particularly form surfaces nearest laser cutting. In such instances the micro columnar scintillation material is usefully redoped with activator;

I. "Film Support" shall mean any substrate in contact with a scintillation material;

J. "Dielectric Material" shall mean any material that is non-conductive to an electrical current;

K. "Reflective material" shall mean a material occupying the interpixel gaps thereby covering the pixels within a scintillator film that reflects light reducing the lateral spread of such light and restricts detectable light to their pixels of origin thereby improving the spatial and contrast resolution of the generated image;

L. "Refractive material" shall mean a material occupying the interpixel gaps thereby covering the pixels within a scintillator film that refracts (i.e. repositions, bends, channels) light reducing the lateral spread of such light and restricts detectable light to their pixels of origin thereby improving the spatial and contrast resolution of the generated image;

M. "Optically Independent" shall mean the substantial prevention of a laterally traveling optical photons in between pixels;

O. "Scintillation" shall mean detectable light resulting form an x-ray or other high energy particles;

P. "Detector Element' shall mean any device that detects or records detectable light within a desired spectral range;

Q. "Process Labile Dopant" shall mean activator or dopant subject to vaporization during high temperature cutting by laser or other high temperature processing. Loss of process labile dopant is particularly notable in the processing of micro columnar scintillation material wherein the dopant has a vapor pressure not substantially above or in fact below that of host material. In some embodiments processing micro columnar scintillation material by excimer laser or other high temperature cutting results in a diminution of about 10 percent or more, or about 20 percent or more and in some instances about 30 percent or more scintillation efficiency. Redoping restores scintillation efficiency to at least about 95 percent and preferably about 98 percent of the original scintillation efficiency accounting for the fact of reduced material. By way of explanation pixellation decreases scintillation material in the film. It is understood that if pixilation decreases the material by 10 percent, the maximum scintillation efficiency will also reduce by 10 percent.

R. "Hot Pressing Technique" shall mean a method of densifying scintillator material by the application of mechanical pressure allowing the densification to take place at lower temperature; and S. "Cold Pressing Technique" shall mean a method of densifying scintillator material by the cold pressing of scintillator materials to a desired density then heating the compacted material allowing it to sinter and the pores to diffuse out.

Micro-columnar scintillator films formed according to the invention using techniques such as vapor deposition offer distinct advantages in terms of intrinsic high resolution at high spatial frequencies, well controlled thickness and the option of fabricating large area substrates. Furthermore, such vapor deposited films can be directly deposited on photo-detectors prior to micro-machining resulting in efficient optical coupling.

Many different materials can be used to produce scintillator films. These materials include but are not limited to doped inorganic compounds such as CsI:Tl, CsI:Na, NaI:Tl, CsBr:Eu and LiI:Eu. Additional materials that are contemplated within the scope of the invention are un-doped simple halides such as CsI, LiI, KI, CsBr, CsCL, CsF, RbF, LiF, CaF2, BaF2 and CdF2.

Upon deposition of the micro columnar scintillation film material onto a film support, the film is subsequently micro-machined forming pixels of various shapes using laser micro-machining. Excimer laser (Resonetices Inc., Nashua, N.H.) micro-machining is one method of scintillator pixellation. However, other methods that are known within the art may be used that include but are not limited to chemical etching or plasma etching.

Individual pixels formed according to the invention are separated by wedge shaped interpixel gaps. This wedge shape pixellation offers advantages in terms of better light channeling and higher detection efficiency. These advantages result from the reflective material within interpixel gaps and ease of fabrication and application of optical coatings and superior mechanical strength of the scintillator film.

EXAMPLE 1

Vapor Deposition

In a first illustrative embodiment microcolumnar scintillation film material has column diameters in the range of 3 to 5 μm. In this embodiment columns were formed from thallium doped cesium iodide ("CsI:Tl") that was deposited on a suitable substrate. Film deposition was performed by vapor deposition using high vacuum thermal evaporation from a localized source onto the substrates undergoing planetary rotation during vapor deposition. A thermal evaporator having a planetary system fitted with multiple planets was used.

During thermal deposition the substrate temperature was maintained at approximately 150 C using a computer controlled halogen lamp heater system (Model QLH0500, Kurt Lesker Company). The evaporation chamber was pumped to a pressure of $5\times10^{-7}$ torr prior to deposition and the film growth was monitored and controlled using a closed-loop quartz thickness monitor system.

To enhance scintillation efficiency, Tl activator concentration in vapor deposited CsI films was maintained in the range of 0.05 to 0.3 mole %. Maintenance of the film's stoichiometry was accomplished by co-evaporation of CsI and TlI at high temperature of about 375° C. This produced a Tl concentration of approximately 0.27% mole % in the micro columnar scintillation film material.

Upon vapor deposition the density of the micro columnar scintillation film material was approximately 4.2 g/cm$^3$. It is contemplated within the scope of this invention that the scintiallator material may be further densified by either a hot pressing technique or a cold pressing technique as known within the art.

After vapor deposition, the micro columnar scintillation film material was pixellated. In this first embodiment a KrF (λ=248 nm) Excimer laser was used to pixelate the micro columnar scintillation film material. The laser output energy was set at approximately 300 mJ and the pulse repetition rate was 200 Hz.

A multi line beam delivery system was employed that allowed simultaneous etching of 31 lines. The laser line length was reduced from the single beam method of 8.3 mm to 3.34 mm. The decrease in the laser line and the use of a multi beam laser allows a gain in throughput with multiple beam method over single beam methods.

The multi line beam delivery system used an unstable resonator followed by a beam homogenizer that produced a highly uniform energy density beam over a 14×14 mm area. To maximize beam utilization a 14×14 mm mask with multiple line or dots or other patterns that may be advantageous in forming interpixel gaps, was placed in the homogenized beam and was imaged onto the micro columnar scintillation film material using a high numerical aperture, multi-element imaging lens assembly. The optics reduced the mask image by a factor of 4 resulting in an image size of approximately 3.5×3.5 mm$^2$.

In an alternative method of pixellation the required line pattern in the micro columnar scintillation film material was accomplished by using a line mask with 8.3 mm×0.18 mm rectangular slot mounted in front of the beam port. The optics consisted of attenuator, mirrors, and a 75 mm focal length cylindrical telescope lens fabricated to image the rectangular slot on the micro columnar scintillation film material with a reduction ratio of 1:1 along the length of the mask and 36:1 along its width. The cutting of the pixel patterns within this alternative method was accomplished by mounting the un-pixellated micro columnar scintillation film material upon a high precision X-Y scanning table. The motion of the scanning table was synchronized with the laser output to ensure that each spot along the scanned line received identical number of pre-determined pulses.

Figure 5:
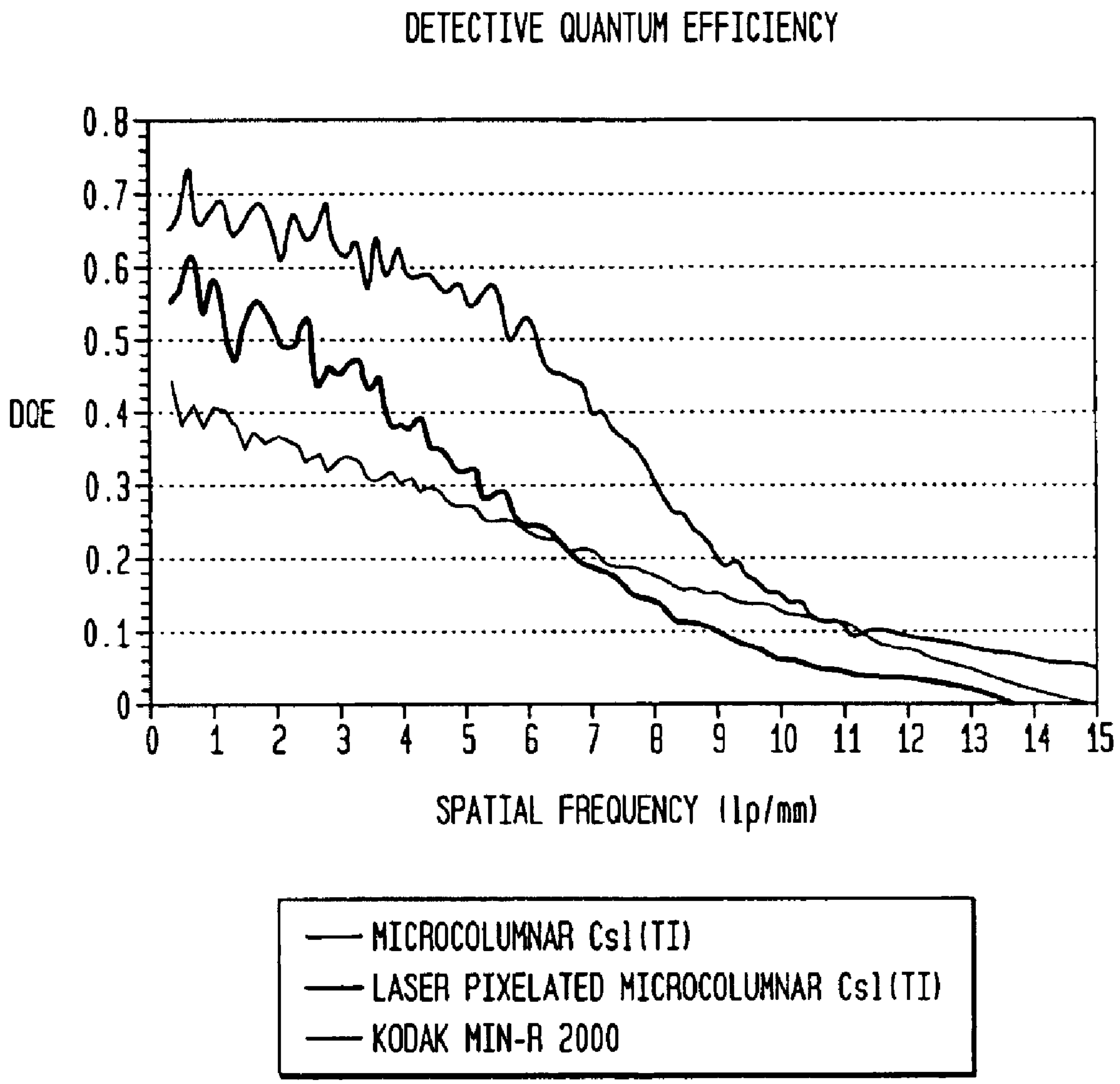
FIG. 5 presents comparative detective quantum efficiency data results of X-Ray imaging by the present invention.

One benefit of pixellation is the reduction of lateral spread of scintillation light (glare fraction) within the film to improve image contrast. As shown in FIG. 5, improvements due to laser pixellation are clearly evident. The pixellation of micro columnar scintillation film material improved resolution and image contrast. Square pixel pattern is shown in FIG. 1A. Other pixel patterns are also useful. However, pixellation and the creation of interpixel gaps entail reducing the fill factor. Other pixel patterns minimize the loss of scintillator fill factor due to laser ablation and glare in the film simultaneously are also contemplated within the scope of this invention.

Figure 3A:
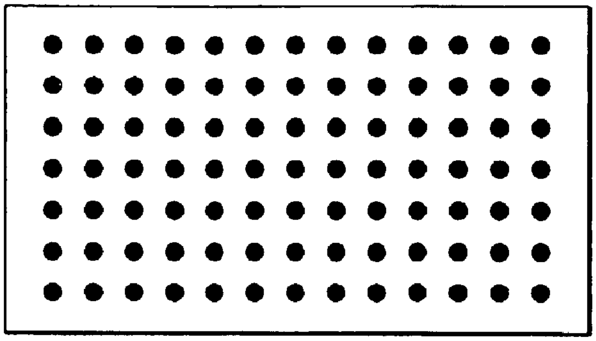
FIGS. 3A, 3B, 3C and 3D illustrates various shapes of the pixels and interpixel gaps of the invention
Figure 3B:
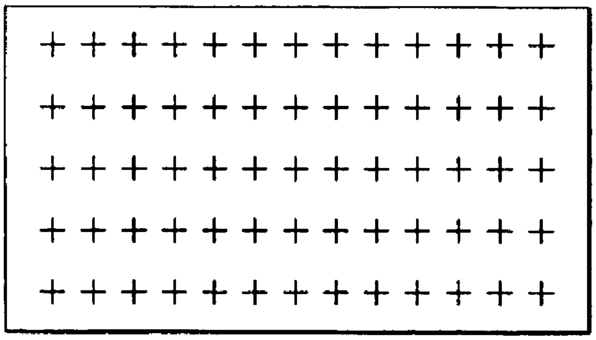
Figure 3C:
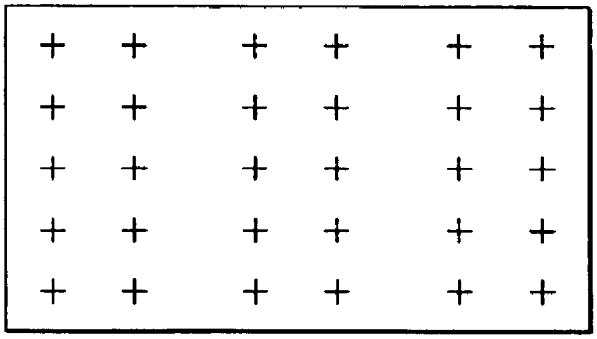
Figure 3D:
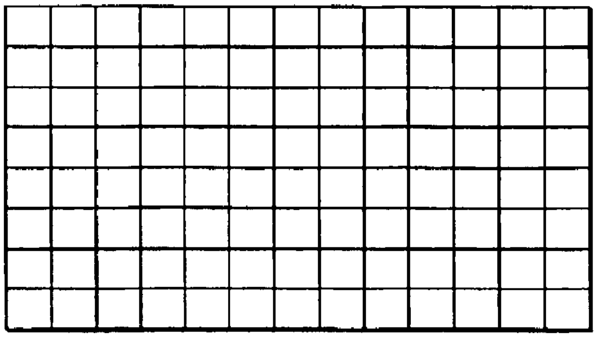

Various interpixel gaps are shown in FIGS. 3A, 3B, 3C and 3D. Dots are shown in FIG. 3A. Lines are shown in FIG. 3B. Single plus signs are shown in FIG. 3C. Double plus signs are shown in FIG. 3D. Interpixel gaps are configured and arranged to block or reflect or absorb laterally traveling photons within about 100 μm or less and preferably about 50 μm.

Figure 4A:
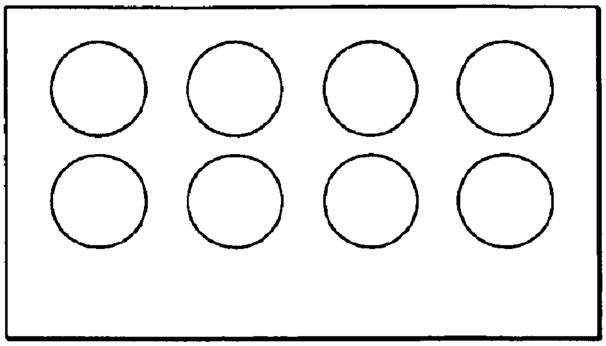
FIGS. 4A, 4B, 4C and 4D illustrates various shapes of the pixels and interpixel gaps of the invention.
Figure 4B:
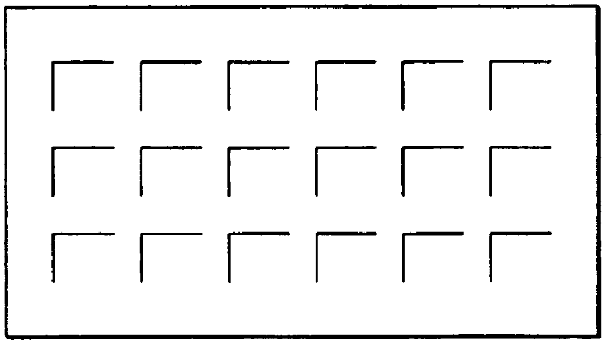
Figure 4C:
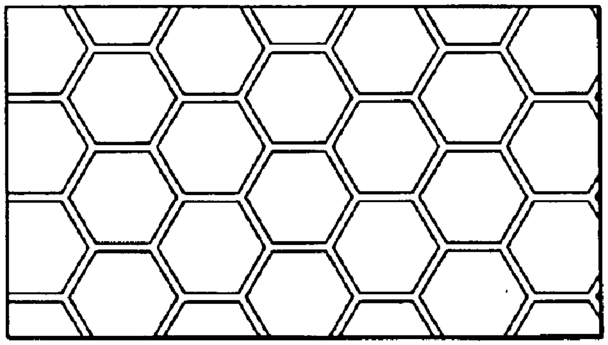
Figure 4D:
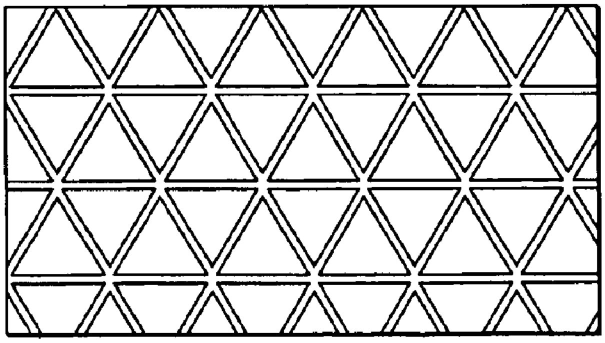

It is contemplated within the scope of the invention that various pixel shapes and interpixel gaps are used to form pixel patterns. Various pixel patterns are shown in FIGS. 4A, 4B, 4C and 4D. Round pin holes are shown in FIG. 4A. Right angle picture corners are shown in FIG. 4B. Hexagonal geometric shapes are shown in FIG. 4C. Triangular shapes are shown in FIG. 4D. It is also contemplated within the scope of this invention that random shaped depressions may be used to achieve pixels of varying shapes and sizes. It further contemplated that pixel patterns may be uniform in placement or non-uniform in their placement. The placement of pixels and the resulting interpixel gaps, whether random or uniform, is such that there is no lateral light path within the micro columnar scintillation film material having an un pixellated area greater than about 100 μm.

Figure 1B:
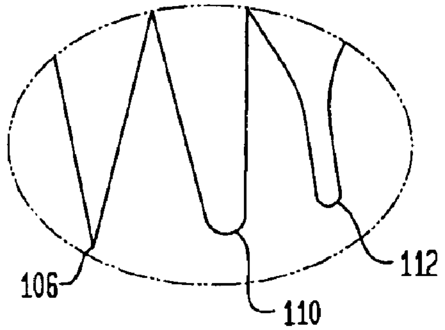
FIG. 1B is a portion of FIG. 1A magnifying a variety of interpixel gaps within reference to linear (wedge shape) (bi-concaved) (bi-convexed)

FIG. 1A is a diagrammatic representation of a micro-columnar scintillation film material 100. Substantially square pixels 101 are an approximate size of about 80 μm×80 μm. In other embodiments the square pixel range in size from about 80 μm×80 μm to about 500 μm ×500 μm. The pixels 101 are separated by interpixel gaps 104 that are approximately 5 to 10 μm in width. These interpixel gaps 104 are substantially wedge shape having a top gap 105 of between approximately 5 to 10 μm and a bottom gap 106 between approximately 0.2 to 0.5 μm (It is understood however that a wedge can end in a point having an effective width of 0). As shown in FIG. 1B the interpixel gaps 104 are substantially wedge shaped. These bottom gaps 106, 110, 112 of the interpixel gaps have sharp bottom gaps 106, rounded bottom gaps 110 and elongated bottom gaps 112. It is contemplated within the scope of the invention that the substantially wedge shape feature of the interpixel gaps 104 can be of any form that has a top gap 105 that is greater is size than the bottom gap 106, 110, and 112. The pixel depth 107 of the interpixel gaps 104 is between approximately 130 to 190 μm.

The micro columnar scintillation film material 100 is positioned upon a fiber optic substrate 108 (Income, Inc. Southbridge, Mass.). The fiber optic substrate 108 is positioned upon an optical detector 109. The optical detector 109 within this example is a charged coupled device array detector. The fiber optic substrate 108 has 6 μm fibers and interstitial Extra Mural Absorbers (EMA).

Other substrates are known in the art. These substrates include but are not limited to fiberoptic substrates, graphite substrates, carbon fiber composite substrates, polymers such as Teflon®, polyester, aluminized mylar, kapton, conventional glass, metals, silicon, quartz. It is also contemplated within the scope of the invention that various digital readout sensors, such as charge coupled device, amorphous Si sensors, charged injection devices and CMOS imagers may be used as substrates.

The optical detector 109 within FIG. 1A is a charged coupled device array detector. Other detection devices contemplated by the invention include but are not limited to exposable films photodiode arrays, charge-injection devices, amorphous silicon detectors, position-sensitive detectors, photomultiplier tubes and image intensifiers.

EXAMPLE 2

Sputter Deposition

In an alternative illustrative embodiment sputter deposition of CsI:Tl was accomplished by using a planar magnetron sputtering deposition system (Kurt Lesker). Prior to the sputtering process, a high vacuum of $10^{-7}$ torr was obtained using a cryogenic pump (oil vapor free) attached to the process chamber. The process chamber contained a substrate holder that was rotated at a speed of approximately 20 rpm to improve the uniformity of the film. A halogen light heater (Model QLH-SPLI, Kurt Lesker Company) was attached to the back side of the substrate holder to maintain substrate temperature at approximately 270° C. during the sputtering process.

Figure 2:
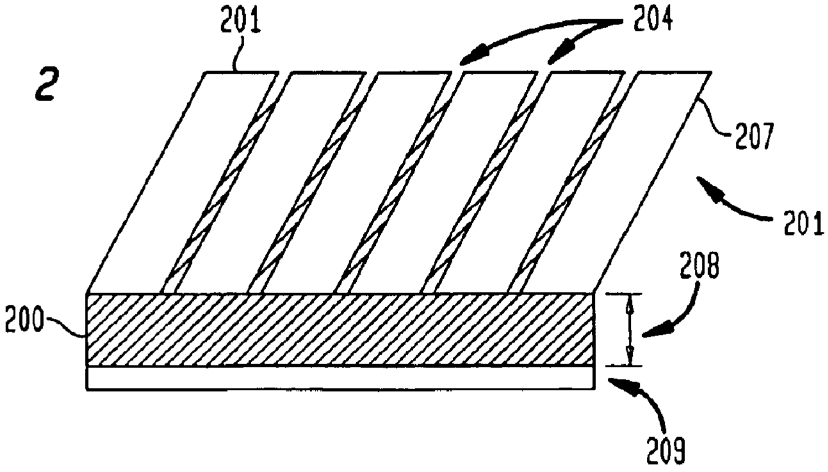
FIG. 2 is a diagrammatic representation of an alternative micro-columnar film pixellated according to the invention.

In this alternative illustrative embodiment commercially available crystalline CsI:Tl targets were used for sputter deposition. To provide optimum material usage and improved deposition rates, the target design was modified to allow the application of high sputtering power while offering low thermal resistance. The sputtering process within this illustrative embodiment used a rf power setting of 30 W, an Ar process pressure of 10 mtorr, and a target DC bias of 250V to achieve a maximum sputtering rate of 0.11 μm/minute Turning to FIG. 2 an alternative configuration for the interpixel gaps 204 is shown. This configuration can be used for films formed from vapor deposition as described in example 1 or for those films formed by sputter deposition as in this current example. This alternative configuration is formed using the multi beam laser method of pixellation illustrated in the first example. The interpixel gaps 204, of this alternative embodiment, are configured in the shape of slanted parallel walls. The use of slanted walls improves the effective scintillator cross-section to the incident radiation. The micro columnar scintillation film material 200 is pixellated into rectangular shaped pixels 201 having an approximate size of between 80 μm×120 μm and 120 μm×160 μm. These pixels 201 are separated by interpixel gaps 204 that are approximately 5 to 10 μm in width.

The interpixel gaps 204 are substantially parallel shape having a continuous interpixel gap 204 of between approximately 5 to 10 μm in width from top to bottom. The pixel depth 207 of the parallel interpixel gaps 204 is between approximately 130 to 190 μm. This pixellated micro columnar scintillation film material 200 is positioned upon a fiber optic substrate 208. It is contemplated within the scope of this invention that the micro columnar scintillation film material can be positioned upon other substrates that are known in the art. The fiber optic substrate 208 is positioned upon an optical detector 209. In this alternative illustrative embodiment the detector is a charged couple device array detector. Other detection devices contemplated within the scope of this invention include but are not limited to exposable films photodiode arrays, charge-injection devices, amorphous silicon detectors, position-sensitive detectors, photomultiplier tubes and image intensifiers.

EXAMPLE 3

Post Pixellation Coatings

Once the micro columnar scintillation film material is pixellated the post pixellated micro columnar scintillation film material is coated. The post pixellation coatings enhance the light collection efficiency of the screen, prevent the inter-pixel light from spreading, and protect the micro columnar scintillation film material from moisture and mechanical damage during normal handling. It has been observed that the pixellated screens show loss of light output beyond what is expected based on the loss of screen fill factor. Pixellated films show approximately 55% light output compared to non-pixellated films. Total gain in the light output after SiO coating (compared to pixellated but uncoated film) varied between 15% to 25%. Therefore, laser pixellated screens coated with SiO showed approximately 63% to 68% light output of a non-pixellated and un-processed CsI:Tl screen. Further enhancement of light collection efficiency of the pixellated screen can be increased by 8% to 10% by the deposition of a reflective aluminum layer.

It is contemplated within the scope of the invention that white coats provide higher reflectance than the metallic coats. To form a white reflective layer, several diffuse reflecting powders can be used. These may include PTFE, $BaSO_4$ and other reflecting powders known within the art. The particle sizes of the powders range from 1 μm, to 3 μm, which is adequate for deposition into narrow grooves. A slurry can be formed by dissolving the powders in a suitable solvent. The slurry is used to fill the interpixel gaps in the pixellated CsI:Tl micro-columnar scintillation film material. Subsequent evaporation of solvent will result in the required reflective coating.

As will be known by those skilled in the art, there are numerous ways of forming coverings with required optical and/or protective properties. The shape of interpixel gaps 104, 204 formed by laser pixellation is actually beneficial from the point of view of forming post pixellation coatings. Specifically, for formation of low refractive index coating using plasma enhanced chemical vapor deposition (PECVD) and metal reflective coating using e-beam evaporation, the material particles encounter no barrier in entering the interpixel gaps. This, in conjunction with the high directionality of deposition using both these techniques, allow for fabrication of uniform coats surrounding individual pixels in the film.

Other materials and methods of deposition of interpixel materials that are known within the art may be used. The interpixel materials that are selected according to the invention have a lower relative refractive indices than that compared to the scintillation material 100, 201. The use of these interpixel materials allows each pixel to perform as an individual optic waveguide avoiding optical crosstalk and improving image contrast by enhancing the fraction of detectable photons.

As scintillator resolution performance is a function of selected pixel geometry (e.g. pixel pitch and inter pixel groove widths in case of a square pixel pattern). Also, pixel pitch determines scintillator fill factor as a function of groove width and pixel size. Based on the above factors, it is contemplated within the scope of this invention that three square pixel patterns with approximately 80 μm, 100 μm, and 120 μm pitch and 5 μm average groove width (10 μm groove opening, and tapering down to 0 μm at the film base) provide a balance between the cost of production (number of lines that need to be cut) and the performance gain.

Other considerations that are important in the pixellation of the micro columnar scintillation film material are the profile of the etched groove and the smoothness of the walls, since these surface features influence the overall effective scintillator area and light channeling within pixels respectively.

The effective scintillator fill factors for three different pixel pitch geometries are listed below in Table 2. It should be noted that coarse pixellation is implemented to boost the low frequency performance (contrast) of a high-resolution micro columnar film. The high frequency response is primarily due to the fine sizes of the needles.

TABLE 2

Effective scintillator fill factors for various pixel pitch.

| Pattern Pitch (μm) | % Fill Factor for 5 μm gap | % Fill Factor for 10 μm gap |
|---|---|---|
| 80 | 94 | 88 |
| 100 | 95 | 91 |
| 120 | 96 | 92 |

Note.
Since the grooves are triangular with the base equal to the gap indicated, the reduction in sensitive volume is only half of what would be computed for rectangular grooves.

In case of fiber optic substrate based CsI:Tl screens, a thin polymer layer will be formed on the relatively rough CsI:Tl film surface (arising from needle shaped micro-columns) to improve the film 'flatness', which is known to affect the reflective properties of coatings. Subsequently, a high reflectance metal layer will be deposited using e-beam evaporation.

It is surmised that local annealing of CsI:Tl during laser ablation may be responsible for removal of Tl dopant from pixel boundaries, causing local loss scintillation efficiency. It has been suggested that this loss of dopant occurs from approximately 5 to 20 μm from the wall of the interpixel gap. Thus, a thin layer of TlI is vapor deposited on the pixellated CsI:Tl surface. Following deposition, the films will be annealed to promote Tl diffusion. The quantity of TlI and annealing temperature profile is varied to optimize the dopant concentration. Care needs to be taken not to over dope the pixellated micro columnar scintillation film material as this will reduce scintillation efficiency.

EXAMPLE 4

Vapor Pressure

Vapor pressure of a scintillator compound and its dopant may vary significantly with temperature and pressure. In the present disclosure, one method is to perform laser pixellation at normal (atmospheric) pressure, so the only critical factor is the variation of vapor pressure with the temperature. It is contemplated within the scope of this invention, however, to perform the laser pixellation at higher pressures than atmospheric, therefore decreasing the probability of material vaporizing at lower temperatures.

Generally, for a given compound, at higher temperatures the vapor pressure is higher. Thus, for a given temperature the material with higher vapor pressure will have higher probability to vaporize. In case of CsI:Tl material, the vapor pressure at 500° C. is $10^{-4}$ torr and the same for TlI is $10^{-2}$ torr. Thus, during laser pixellation, where local temperature is very high, Tl will evaporate quicker than the CsI, leaving the local area with much less concentration of activator Tl. This results in reduced scintillation efficiency. Table 1 lists the temperature in ° C. for which the material vapor pressure is $10^{-4}$ torr for some commonly used scintillator materials.

TABLE 1

| Material | Temperature (° C.) |
|---|---|
| CsI:Tl | |
| CsI | 500 |
| TlI | 250 |
| LiI:Eu: | |
| LiI | 400 |
| EuI | 500 |
| CsBr:Tl | |
| CsBr | 390 |
| TlI | 250 |
| CsCl:Tl | |
| CsCl | 500 |
| TlI | 250 |

While the invention has been described in connection with specific illustrative embodiments thereof, it will be understood that it is capable of further modifications and this application is intended to cover any variations, uses, or alterations of the invention. In general, the principles of the invention and including such departures from the present disclosure as come within known or customary practice within the art to which the invention pertains and as may be applied to the essential features hereinbefore set forth and as follows in the scope of the appended claims.

Various other changes, omissions and additions in the form and detail of the present invention may be made therein without departing from the spirit and scope of the invention. Therefore, the above description should not be construed as limiting, but merely as exemplification of the various embodiments.

What is claimed is:

1. A reduced optical cross talk micro pixellated scintillator for x-ray imaging comprising:

a scintillation substrate; and a micro columnar scintillation film in contact with said scintillation substrate said microcolumnar scintillation film formed from scintillator material, said scintillator material comprising host material and dopant, wherein said microcolumnar scintillator film is subdivided into arrays of substantially optically independent pixels having wedge shaped interpixel gaps, whereby said optically independent pixels channel detectable light to a detector element.

2. The micro pixellated micro columnar scintillator film according to claim 1, wherein said scintillator material comprises a process labile dopant wherein said dopant has a vapor pressures about equal to or lower than said host material.

3. The micro pixellated micro columnar scintillator film according to claim 1, wherein said scintillation material is selected from a group consisting of CsI:Na, NaI:Tl, CsBr:Eu, LiI:Eu and CsI:TI.

4. The micro pixellated micro columnar scintillator film according to claim 1, wherein said scintillation material is selected from a group consisting of CsI, LiI, KI, CsBr, CsCL, CsF, RbF, LiF, CaF2, BaF2 and CdF2.

5. The micro pixellated micro columnar scintillator film according to claim 1, wherein said scintillation substrate is selected from a group consisting of fiberoptic substrates, graphite substrates, carbon fiber composite substrates, polytetrafluroethylene, polyester, aluminized polyester, polyimide, glass, metals, silicon, quartz, charged coupled device silicon detectors, amorphous Si sensors, CMOS imagers, and charged injection devices.

6. The micro pixellated microcolumnar scintillator film according to claim 1, wherein said pixels range in size from about 35×35 to 500×500 $\mu$m.

7. The micro pixellated micro columnar scintillator film according to claim 1, wherein said interpixel gaps range in size from about 1 to 50 $\mu$m in width.

8. The micro pixellated micro columnar scintillator film according to claim 1, wherein said detectable light is substantially matched to a spectral sensitivity of a digital readout sensor.

9. The micro pixilated micro columnar scintillator film according to claim 1, wherein said interpixel gaps are filled with a reflective coating that reduces optical cross talk between said pixels.

10. The micro pixellated micro columnar scintillator film according to claim 1, wherein said subdivision into pixels reduces lateral spread of said detectable light thereby enhancing spatial and contrast resolution.

11. The micro pixellated micro columnar scintillator film according to claim 1, wherein said interpixel gaps are filled with a low refractive index coating.

12. The micro pixellated micro columnar scintillator film according to claim 1, wherein said pixels are configured of varying geometric forms said geometric forms selected from the group consisting of round, square, rectangular, octagonal, oblong and triangular.

13. The micro pixelated micro columnar scintillator film according to claim 1, having interpixel gaps bounded by surfaces wherein said surfaces of said interpixel gaps are coated with a reflective coating that reduces optical cross talk between said pixels.

14. A micro pixelated micro columnar scintillator film according to claim 1, having interpixel gaps bounded by surfaces, wherein said surfaces of said interpixel gaps are coated with a low refractive index coating.

15. A reduced optical cross talk micro pixellated scintillator for x-ray imaging comprising:

a scintillation substrate; and a micro columnar scintillation film in contact with said scintillation substrate said microcolumnar scintillation film formed from scintillator material, said scintillator material comprising host material and dopant, wherein said microcolumnar scintillator film is subdivided into arrays of substantially optically independent pixels having interpixel gaps, whereby said optically independent pixels channel detectable light to a detector element wherein said interpixel gaps are substantially wedge shape, wherein said wedge shape produces light channeling enhancing the fraction of detectable photons.

16. A method of making a micro pixilated scintillator film for x-ray imaging comprising the steps of:

a) providing a scintillation substrate;

b) providing an activator doped scintillator material, wherein said activator doped scintillator material can be used to form a micro columnar scintillator film;

c) vapor depositing said micro columnar scintillator film upon said scintillation substrate;

d) pixelating said micro columnar scintillator film into multiple scintillator pixels, wherein said scintillator pixels are separated by interpixel gaps;

e) redoping said micro columnar scintillator film; and f) filling said interpixel gaps with an optical coating.

17. The method according to claim 16, wherein said pixilation is performed by multi-beam laser micromachining.

18. The method according to claim 17, wherein said laser micro-machining is performed using an excimer laser such as KrF (248) laser beam.

19. The method according to claim 18, wherein said pixelating is performed in a high pressure environment thereby decreasing the vaporization of the dopant.

20. The method according to claim 16, wherein said pixelating is performed by plasma etching.

21. The method according to claim 16 further comprising the step of densifying the micro columnar scintillation film material, wherein said densifying involves cold pressing said activator doped scintillation film and then heating said micro columnar scintillation film to a temperature sufficient to allow the cold pressed micro columnar scintillation film material to sinter together and the pores to diffuse out.

22. The method according to claim 16 further comprising the step of densifying the micro columnar scintillation film material, wherein said densifying is performed by hot pressing said micro columnar scintillation film by the application of external mechanical pressure to said micro columnar scintillation film.

23. The method according to claim 16, wherein said micro columnar scintillation film material is selected form the group consisting of CsI:Na, NaI:Tl, CsBr:Eu, LiI:Eu and CsI:Tl.

24. The method according to claim 16, wherein said interpixel gaps are substantially wedge shape.

25. The method according to claim 16, wherein said interpixel gaps are substantially parallel slanted walls.

26. The method according to claim 16, wherein said interpixel gaps between said pixels are filled with a reflector dielectric material to reduce interpixel crosstalk.

27. The method according to claim 16, wherein said pixels are square and range in size from about 35×35 to about 500×500 $\mu$m.

28. The method according to claim 16, wherein said interpixel gaps are about 1 to 50 $\mu$m in width.

29. The method according to claim 16, wherein said interpixel gaps are substantially wedge shape, wherein said wedge shape produces better light channeling.

30. The method according to claim 16, wherein said interpixel gaps are wedge shape and allow for uniform application of an optical coating.

31. The method according to claim 16, wherein said subdivision into pixels reduces lateral spread of said detectable light thereby enhancing spatial and contrast resolution.

32. The method according to claim 16, wherein said micro columnar scintillation film material has a density of 4.2 g/cm$^3$.

33. The method according to claim 16, wherein said scintillation substrate is selected for the group consisting of fiberoptic substrates, graphite substrates, carbon fiber composite substrates, polytetrafluroethylene polyester, aluminized , polyimide, glass, metals, silicon, quartz, charged coupled device silicon detectors, amorphous Si sensors and CMOS imagers.

34. The method according to claim 16, wherein said pixels are configured of varying geometric forms said geometric forms selected from the group consisting of round, square, rectangular, oblong and triangular.

35. The method according to claim 16, wherein said re-doping is with a dopant that is vapor deposited on the pixilated micro columnar scintillation film material allowing for a uniform concentration of said dopant.

36. A micro pixellated scintillator for x-ray imaging comprising;

a scintillation substrate, wherein said scintillation substrate is a fiber optic substrate;

a micro columnar scintillation film material formed by the vapor deposition of CsI:Tl, wherein said micro columnar scintillation film material is subdivided into pixels by excimer laser micro-machining forming optically independent pixels and interpixel gaps said interpixel gaps being substantially wedge shaped wherein said interpixel gaps are filled with a reflective coating that prevents optical cross talk between said pixels and allows for detectable light to be channeled to a detector whereby said channeling of said detectable light prevents lateral spread of said detectable light thereby enhancing spatial and contrast resolution of an x-ray image.

* * * * *